US010120658B2

(12) United States Patent
Jing et al.

(10) Patent No.: US 10,120,658 B2
(45) Date of Patent: Nov. 6, 2018

(54) METHOD AND SYSTEM FOR REALIZING SOFTWARE DEVELOPMENT TASKS

(71) Applicant: SHENZHEN TINNO WIRELESS TECHNOLOGY CO., LTD, Shenzhen (CN)

(72) Inventors: Hua Jing, Shenzhen (CN); Changjie Fan, Shenzhen (CN)

(73) Assignee: SHENZHEN TINNO WIRELESS TECHNOLOGY CO., LTD., Shenzhen (CN)

( * ) Notice: Subject to any disclaimer, the term of this patent is extended or adjusted under 35 U.S.C. 154(b) by 178 days.

(21) Appl. No.: 15/157,083

(22) Filed: May 17, 2016

(65) Prior Publication Data

US 2016/0259631 A1 Sep. 8, 2016

Related U.S. Application Data

(63) Continuation of application No. PCT/CN2015/074595, filed on Mar. 19, 2015.

(30) Foreign Application Priority Data

Mar. 24, 2014 (CN) .......................... 2014 1 0118088

(51) Int. Cl.
*G06F 8/71* (2018.01)
*G06F 8/36* (2018.01)
(52) U.S. Cl.
CPC . *G06F 8/36* (2013.01); *G06F 8/71* (2013.01)
(58) Field of Classification Search
CPC ............................ G06F 8/36; G06F 8/70–8/71
(Continued)

(56) References Cited

U.S. PATENT DOCUMENTS 7,711,678 B2 * 5/2010 Zhang .................... G06F 9/466
707/782
9,632,817 B2 * 4/2017 Emuchay ............... G06Q 10/06
(Continued)

FOREIGN PATENT DOCUMENTS

CN 101535950 A 9/2009
CN 102375731 A 3/2012
(Continued)

OTHER PUBLICATIONS

The World Intellectual Property Organization (WIPO) International Search Report for PCT/CN2015/074595 dated May 15, 2015.

*Primary Examiner* — Marina Lee
(74) *Attorney, Agent, or Firm* — Anova Law Group, PLLC

(57) ABSTRACT

A method for realizing reuse among software development tasks is provided. The method includes receiving information data of a completed software development task, and generating a first identification corresponding to the software development task. The method includes receiving program code corresponding to the completed software development task and the first identification, and generating one or more second identifications of the program code. Further, the method includes acquiring the first identification and the second identifications corresponding to the completed software development task in a software code management system according to a predetermined condition; storing the first identification and the second identifications corresponding to the completed software development task in a software development task database to establish an association relationship between the first identification and the second identifications corresponding to the existing software development task; and outputting the program code to be reused based on the first identification.

15 Claims, 7 Drawing Sheets

(58) Field of Classification Search
USPC .................................... 717/106, 107, 121
See application file for complete search history.

(56) References Cited

U.S. PATENT DOCUMENTS

| | | | |
|---|---|---|---|
| 2002/0138321 A1* | 9/2002 | Yuan | G06Q 10/10 705/80 |
| 2005/0021708 A1* | 1/2005 | Raghuraman | G06Q 10/10 709/223 |
| 2007/0027742 A1* | 2/2007 | Emuchay | G06F 9/466 705/7.27 |
| 2008/0120484 A1* | 5/2008 | Zhang | G06F 9/466 711/163 |
| 2009/0055296 A1* | 2/2009 | Nelsen | G06Q 20/10 705/30 |
| 2011/0191747 A1* | 8/2011 | Charisius | G06F 8/20 717/103 |
| 2014/0351656 A1* | 11/2014 | Moser | G06F 11/30 714/45 |
| 2016/0259631 A1* | 9/2016 | Jing | G06F 8/36 |

FOREIGN PATENT DOCUMENTS

| | | |
|---|---|---|
| CN | 102915233 A | 2/2013 |
| CN | 103914300 A | 7/2014 |

\* cited by examiner

METHOD AND SYSTEM FOR REALIZING SOFTWARE DEVELOPMENT TASKS

CROSS-REFERENCES TO RELATED APPLICATIONS

This application is a continuation application of PCT Patent Application No. PCT/CN2015/074595, filed on Mar. 19, 2015, which claims priority of Chinese Application No. 201410118088.7, filed on Mar. 24, 2014, the entire contents of all of which are hereby incorporated by reference.

FIELD OF THE INVENTION

The present invention relates to the technical field of software development and, more particularly, relates to methods and systems for realizing software development tasks.

BACKGROUND

A software project, such as Android operating system and other large software projects, usually has a huge number of code files, so the software version management system has become an essential code management tool in the development procedure of a software project. Especially, when a GTI distributed version management system is used for effective and high speed management of software projects scaling from very small to very large, its processing is fast and flexible, suitable for distributed development, and it can easily resolve any conflicts between any random two developers.

A software project typically includes a plurality of software development tasks. These software development tasks are used to achieve different functions, such as customer demands or software defects. In a software version management system, the entire program code of a software project may be separated into hundreds or even thousands of code modules and stored in different code repositories. The program codes corresponding to different software development tasks may be stored in different code repositories, while the program code corresponding to each software development task may also be divided into a plurality of parts and scattered in different code repositories.

In different software projects, there may be one or more same software development tasks. During the development of software projects, if the software development tasks completed in other software projects can be reused, there is no need to re-edit the codes of these software development tasks, greatly improving the efficiency of software project development. However, in the process of software project development, the program code for a software development task may involve multiple program code changes in one or more code repositories, resulting in multiple code submission records in the software version management system. There are only sequential relationships among these code submissions, and there are no task level relationships among them, so tracking the completion process of a complex software development task may be complicated. When it is needed to reuse the software development task, developers need to, according to the instructions provided by the software version management system, find the codes related to the software development task at each code repository, or consult all the relevant information about the software development task according to the code submission information provided by the software version management system. This makes the developers to spend a lot of time and efforts to find the corresponding program code, and is not favorable to the effective reuse of the codes of software development tasks, greatly decreasing the development efficiency of software projects.

BRIEF SUMMARY OF THE DISCLOSURE

One aspect of the present disclosure includes a method for realizing reuse among software development tasks. The method includes receiving information data of a completed software development task, and generating a first identification corresponding to the software development task. The method includes receiving program code corresponding to the completed software development task and the first identification, and generating one or more second identifications of the program code. Further, the method includes acquiring the first identification and the second identifications corresponding to the completed software development task in a software code management system according to a predetermined condition; storing the first identification and the second identifications corresponding to the completed software development task in a software development task database to establish an association relationship between the first identification and the second identifications corresponding to the existing software development task; and outputting the program code to be reused based on the first identification.

Another aspect of the present disclosure includes a system for realizing reuse among software development tasks. The system includes a project task tracking system configured to receive information data of a completed software development task, and to generate a first identification corresponding to the software development task. The system also includes a software code management system configured to receive program code corresponding to the completed software development task and the first identification, and to generate one or more second identifications of the program code. Further, the system includes a code recording-submitting-analyzing server configured to acquire the first identification and the second identifications corresponding to the completed software development task in the software code management system according to a predetermined condition, and to store the first identification and the second identifications corresponding to the completed software development task in a software development task database to establish an association relationship between the first identification and the second identifications corresponding to the existing software development task.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

It should be noted that, in the implementation method of the present invention for software development tasks, the software development task may refer to a program or module in a software project for achieving a minimum functionality or work. Of course, the software development task is not limited to a program or module for achieving a minimum functionality or work. The implementation of a software development task mainly refers to the reuse of the program codes already completed in other software development tasks, during the process of a software development, to realize the software development task currently under development.

For example, for a music player software project, displaying lyrics can be taken as a software development task in the software project. Or the lyrics font color in displaying lyrics can also be taken as a software development task. In the development of music player software project A, by obtaining the program code of the lyrics displaying task that has been completed in music player software project B, the lyrics displaying task in music player software project A can be achieved. Therefore, there is no need to do additional composing work for the program code of the lyrics displaying task in music player software project A, instead the lyrics displaying task can be achieved by directly using the existing program code from the music player software project B, thus improving the development efficiency of the software project A.

Thus, the main objectives of the present invention include providing an implementation method and system for software development tasks, which can quickly obtain the program code of the lyrics displaying task that have been completed in music player software project B, and thus providing the obtained program code to other software development tasks that need to reuse these program codes. In the above example, the program codes for the software development tasks in other software projects are reused. Of course, the program codes for the related software development tasks in other versions of the same software project may also be reused. The above examples are for explanations only, and do not limit the present invention.

Figure 10:
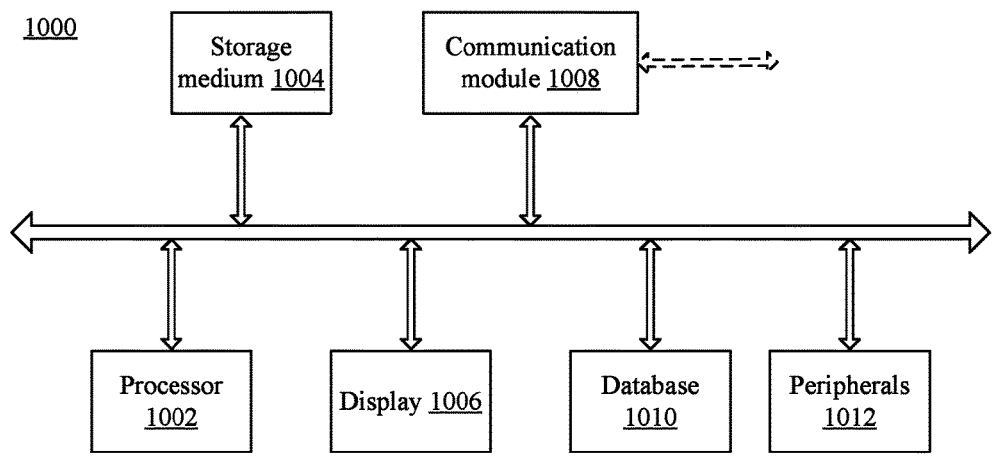
FIG. 10 illustrates an exemplary computer system with the disclosed embodiments.

The implementation method of the present invention for achieving software development tasks mainly includes a program code management part and a program code transplantation and reuse part. The disclosed methods may be implemented on a computer system, in a distributed or independent manner. FIG. 10 shows a block diagram of an exemplary computer system.

As shown in FIG. 10, computer system 1000 may include a processor 1002, a storage medium 1004, a monitor 1006, a communication module 1008, a database 1010, and peripherals 1012. Certain devices may be omitted and other devices may be included.

Processor 1002 may include any appropriate processor or processors. Further, processor 1002 can include multiple cores for multi-thread or parallel processing. Storage medium 1004 may include memory modules, such as ROM, RAM, flash memory modules, and erasable and rewritable memory, and mass storages, such as CD-ROM, U-disk, and hard disk, etc. Storage medium 1004 may store computer programs for implementing various processes, when executed by processor 1002.

Further, peripherals 1012 may include I/O devices such as keyboard and mouse, and communication module 1008 may include network devices for establishing connections through the communication network. Database 1010 may include one or more databases for storing certain data and for performing certain operations on the stored data, such as database searching.

Figure 1:
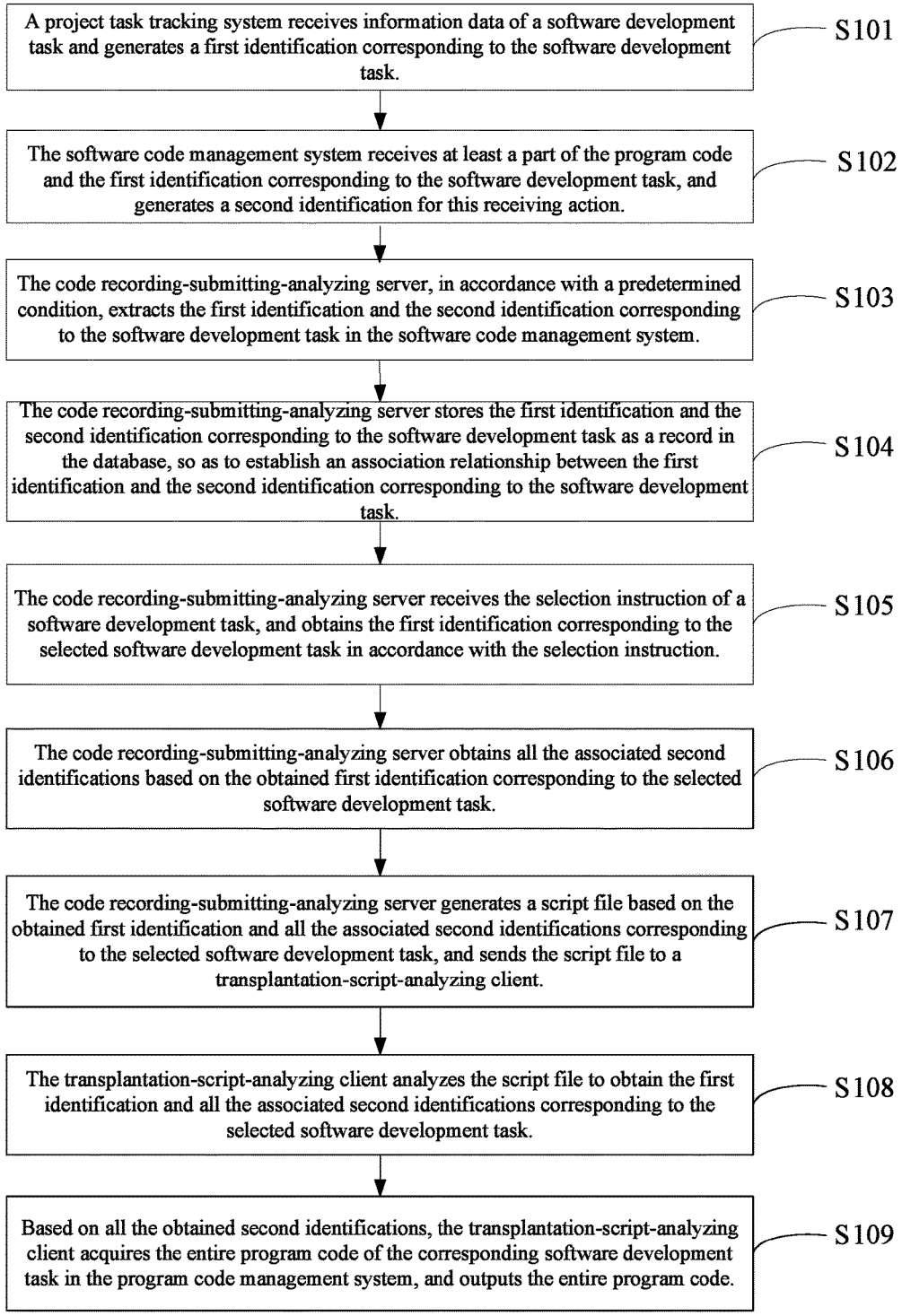
FIG. 1 illustrates a flow chart for an exemplary implementation process for software development tasks consistent with the disclosed embodiments.

Referring to FIG. 1, an exemplary implementation method for software development tasks may include following steps.

Step S101: a project task tracking system receives information data of a software development task and generates a first identification corresponding to the software development task.

The project task tracking system mainly provides the management functions during a software development process, such as JIRA, Bugzilla, and is usually a B/S architecture software. The project task tracking system manages software project information by establishing a database through public RDBMS (relational database management system, such as MySQL). During the software project development, the information of the software project to be developed is firstly inputted to the project task tracking system, such as the name of the software project (e.g., software development for smart phones), to create a development task of a software project in the project task tracking system.

Further, all the software development tasks of the software project to be developed, i.e., all the functional modules for realizing the software project, are inputted. The size of a software development task can be chosen according to actual needs. For example, the lyrics displaying of a music player can be taken as a software development task, and/or the lyrics font in lyrics displaying can be taken as a software development task independently.

After receiving the information data of a software development task inputted by a user, the project task tracking system saves or stores the information data of the software development task under the general directory corresponding to the software project. The information data of a software development task may include, for example, the name, functional description, customer requirements, and software defect, etc., of the software development task. In addition, the project task tracking system generates a first identification corresponding to the software development task. Each software development task has a unique first identification.

Step S102: the software code management system receives at least a part of the program code and the first identification corresponding to the software development task, and generates a second identification for this receiving action.

After the software project to be developed and the software development tasks to be developed under this software project are established in the project task tracking system, developers can upload the program code corresponding to the software develop task to the software code management system. For example, developers can upload the program code of a software development task to the software code management system in one time, or can upload the program code of a software development task to the software code management system in multiple times.

That is, in the process of composing the program code of a software development task, developers may upload the entire program code of the software development task at once, or can divide the program code into several parts and upload these parts in multiple times. Or developers may revise a part of the program code many times and correspondingly upload the revised part of the code many times. Regardless of the manner in which developers upload the program code, after receiving the program code corresponding to the software development task, the software code management system generates the second identification of the current receiving action, identifying the program code of the software development task received by the software code management system. That is, the second identification corresponds to the program code of the software development task received by the software code management system at this time. The software code management system stores the received the program code in code repositories.

Each time when the software code management system receives the program code corresponding to a software development task, it generates a unique second identification of this receiving action, a receipt, and each second identification corresponds to the program code of the software development task received this time. For example, for a software development task, when the software code management system receives the program code corresponding to the software development task for three times, it generates three different second identifications. Each second identification corresponds to a receiving action, and corresponds to program code received by this receiving action.

In addition, the software code management system also receives the first identification corresponding to the software development task, wherein the first identification may be uploaded by developers to the software code management system when the program code of the software development task is uploaded. Of course, in other embodiments, the first identification may also be sent to the software code management system by the project task tracking system.

Step S103: the code recording-submitting-analyzing server, in accordance with a predetermined condition, extracts the first identification and the second identification corresponding to the software development task in the software code management system.

Specifically, at a fixed time interval the code recording-submitting-analyzing server extracts from the software code management system the first identification corresponding to the software development task received by the software code management system, and the second identification of the present receiving action generated when the software code management system receives a part of or the entire program code of the software development task.

In other embodiments, the code recording-submitting-analyzing server, upon detecting that the software code management system generates the second identification of the present receiving action, extracts the first identification and second identification corresponding to the software development task from the software code management system. Of course, after the software code management system generates the second identification corresponding to the present receiving action, the software code management system can submit the first identification and the second identification corresponding to the software development task to the code recording-submitting-analyzing server, such that the code recording-submitting-analyzing server can get the first identification and the second identification corresponding to the software development task.

Step S104: the code recording-submitting-analyzing server stores the first identification and the second identification corresponding to the software development task as a record in the database, so as to establish an association relationship between the first identification and the second identification corresponding to the software development task.

For example, after receiving the first identification and the second identification corresponding to the software development task, the code recording-submitting-analyzing server stores the first identification and the second identification corresponding to the software development task as a record in the database with the first identification as the primary key, to establish the association relationship between the first identification and the second identification, and thus the association relationship between the software development task in the project task tracking system and the program code corresponding to the software development task in the software code management system is established.

Further, the program code of the software development task may be divided into multiple parts and uploaded multiple times. Each time when the software code management system receives a different part of the program code of the software development task at a different time, a second identification for the part of the program code corresponding to the present receiving action will be generated. Therefore, when a software development task corresponds to a plurality of second identifications, each time receiving the first identification and a second identification corresponding to the software development task, the code recording-submitting-analyzing server establishes the association relationship between the first identification and the second identification. The first identification has association relationships with the multiple second identifications respectively, corresponding to the multiple parts of the program code of the program development task.

The above steps S101-S104 may be used in the process of completing a software development task for the first time, including a process of entering the information data of a software development task to the project task tracking system to establish a software development task, and a process of storing for the first time the program code of the software development task at the software code management system, and further the establishment of the association relationships between the software development task in the project task tracking system and the program code of the software development task in the software code management system. In the subsequent development of other software projects, when it is needed to reuse a software development task, i.e., to reuse the software development task completed in another software project, developers can select the software development task to be reused from the code recording-submitting-analyzing server. That is, the entire program code corresponding to the software development task can be automatically and quickly obtained from the software code management system, so as to realize the reuse of the software development task.

Step S105: the code recording-submitting-analyzing server receives the selection instruction of a software development task, and obtains the first identification corresponding to the selected software development task in accordance with the selection instruction.

Specifically, the code recording-submitting-analyzing server has a human-computer interaction interface. The code recording-submitting-analyzing server continuously acquires the first identifications respectively corresponding to all the software development tasks in the project task tracking system, and based on each first identification acquires the information data corresponding to the software development task, and then display the acquired information data of the software development task to developers through the human-computer interaction interface, providing developers reference information on selecting the software development tasks to be reused in other software projects. Of course, developers can also search for the software development tasks that they need to reuse at the code recording-submitting-analyzing server, so as to obtain the information data related to the software development task through the code recording-submitting-analyzing server.

When developers select a software development task for reuse at the code recording-submitting-analyzing server, the code recording-submitting-analyzing server receives the selection instruction for the software development task and, in accordance with the selection instruction, gets the first identification corresponding to the selected software development task. When a software development task is in the selected state, the code recording-submitting-analyzing server can obtain the first identification of the software development task at the selected state.

Step S106: the code recording-submitting-analyzing server obtains all the associated second identifications based on the obtained first identification corresponding to the selected software development task.

When the program code of the selected software development task is divided into multiple parts and uploaded multiple times, each part of the program code corresponds to a second identification, and each second identifier has association relationship with the first identification of the software development task. Therefore, after obtaining the first identification corresponding to the selected software development task, based on the obtained first identification, the code recording-submitting-analyzing server can obtain all the second identifications.

Step S107: the code recording-submitting-analyzing server generates a script file based on the obtained first identification and all the associated second identifications corresponding to the selected software development task, and sends the script file to a transplantation-script-analyzing client.

The code recording-submitting-analyzing server generates the script file with the first identification and all the associated second identifications corresponding to the selected software development task (e.g., the script file contains the first identification and all the associated second identifications). The generated script file can be a script file in XML format, or it can be a script file in other formats such as HTML. After the script file is generated, the code recording-submitting-analyzing server submits the script file to the transplantation-script-analyzing client.

Step S108: the transplantation-script-analyzing client analyzes the script file to obtain the first identification and all the associated second identifications corresponding to the selected software development task.

After receiving the script file sent by the code recording-submitting-analyzing server, the transplantation-script-analyzing client analyzes the script file to extract the first identification corresponding to the software development task and all the associated second identifications in the script file.

Step S109: based on all the obtained second identifications, the transplantation-script-analyzing client acquires the entire program code of the corresponding software development task in the program code management system, and outputs the entire program code.

Thus, through the above steps S105-S109, the transplantation and reuse of the program code of the software development task in the software code management system may be realized.

Each second identification corresponds to the part of program code received by the code management system at a receiving action. Therefore, based on the association relationship between the first identification and the second identification corresponding to the software development task, the entire program code of the selected software development task can be quickly acquired through the second identification, and outputted. So developers can transplant the entire program code corresponding to selected software development task outputted by the transplantation-script-analyzing client, to other software projects or an upgraded version of the same software project, thereby achieving the reuse of software development task. This approach does not require developers to spend a lot of time and efforts to find the program code related to the software development task to be reused from the software code management system, greatly improving the development efficiency of software projects.

When one first identification is associated with only one second identification, indicating that the program code corresponding to the software development task is one-time uploaded, all the program code outputted by the transplantation-script-analyzing client is the entire program code. When one first identification is associated with a plurality of second identifications, indicating that the program code corresponding to the software development task is divided into multiple parts and uploaded multiple times, the transplantation-script-analyzing client, based on the plurality of second identifications, acquires all parts of program code, each of which corresponds to a second identification from the software code management system. The transplantation-script-analyzing client then combines the obtained all parts of the program code to obtain the entire program code corresponding to the software development task, and outputs the resultant combined program code. Therefore, developers can directly transplant the program code outputted by the transplantation-script-analyzing client to other software projects, without the need to spend more time and efforts in searching for the program code of software development task.

Alternatively, the software code management system receives additional note information about the software development task, besides the first identification corresponding to the software development task. Specifically, when uploading the program code of a software development task to the software code management system, developers make notes on the uploaded program code according to pre-established rules, and uploads the note information to the software code management system.

For example, the note information may include the first identification corresponding to the software development task, the name of the software development task, and the functionality description of the upload code, and of course, can also include other information, such as the development status information. In subsequent reuse of the software development task, when the transplantation-script-analyzing client acquires all parts of program codes, the note information for each part of the program code can be acquired together and outputted, so developers can get the information related to every part of the program code through the note information.

After receiving the note information, the software code management system, based on the received note information, automatically generates receiving information for this receiving action, which includes the first identification of the software development task, the corresponding name and functionality description and other information in the note information, and stores the receiving information together with the received program code in code repertories. The code recording-submitting-analyzing server, upon detecting the generation of a second identification by the software code management system, acquires the second identification and the receiving information of this receiving action generated when the second identification is generated, and analyzes this receiving information to extract the first identification corresponding to the software development task, the name of the software development task, related functionality description and other information from the receiving information of this receiving action.

After obtaining the first identification and the second identification corresponding to the software development task, the first identification and the second identification are stored in the database to establish the association relationships between them. In a subsequent reuse of the software development task, through the association relationship between the first identification and the second identification, the entire program code of the software development task can be quickly obtained.

Figure 2:
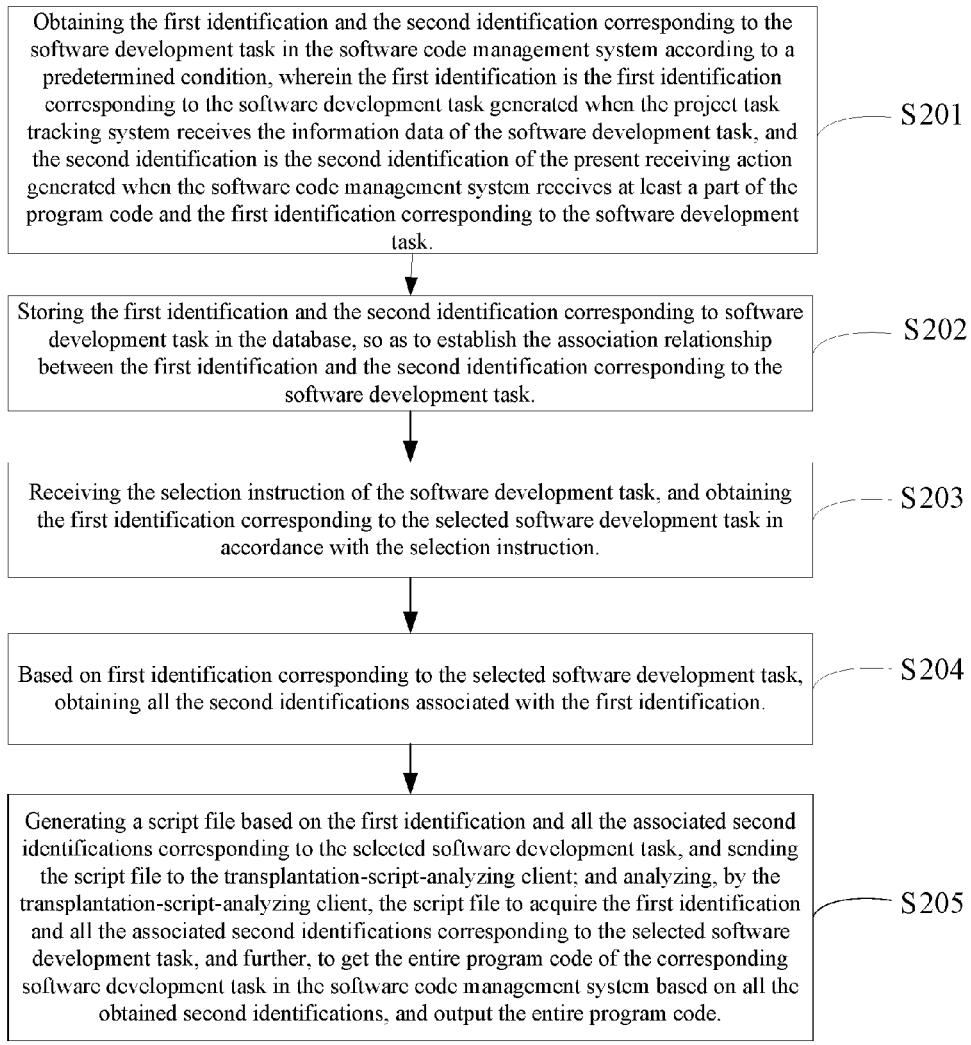
FIG. 2 illustrates a flow chart for another exemplary implementation process for software development tasks consistent with the disclosed embodiments.

Referring to FIG. 2, another exemplary implementation method for software development tasks may include following steps.

Step S201: obtaining the first identification and the second identification corresponding to the software development task in the software code management system according to a predetermined condition, wherein the first identification is the first identification corresponding to the software development task generated when the project task tracking system receives the information data of the software development task, and the second identification is the second identification of the present receiving action generated when the software code management system receives at least a part of the program code and the first identification corresponding to the software development task.

In the process of software development, the software project information is pre-entered into the project task tracking system, and then the information data on all the software development tasks under this software project are entered. The project task tracking system, upon receiving the data information of a software development task, generates a first identification corresponding to the software development task, and each software development task corresponds to a unique first identification. After the information data of the software development task is entered, developers can upload the program code of the software development task to the software code management system, together with the first identification corresponding to the software development task. The first identification can also be uploaded in form of note information, that is, the note information including the first identification can be uploaded according to pre-established rules.

The software code management system, upon receiving the program code and the note information of the software development task, generates the second identification of the present receiving action. Further, the software code management system, based on the received note information automatically, generates the receiving information of the present receiving action, which includes the first identification. By obtaining the receiving information of the present receiving action, and analyzing the receiving information of the present receiving action, the first identification corresponding to software development task can be obtained. Each time when the software code management system receives the program code corresponding to a software development task, it generates a second identification, and the second identification is used to identify the program code of the software development task received by the software code management system this time.

The said predetermined condition may be obtaining the first identification and the second identification corresponding to the system software development task in the software code management system at a fixed time interval. It may also be, upon detecting that the software code management system generates a second identification of this receiving action, obtaining the first identification and the second identification corresponding to the software development task in the software code management system. Of course, it may also be receiving the first identification and the second identification corresponding to the software development task sent by the software code management system.

Step S202: storing the first identification and the second identification corresponding to software development task in the database, so as to establish the association relationship between the first identification and the second identification corresponding to the software development task.

After the first identification and the second identification corresponding to the software development task are obtained, they are stored as one record in the database, so as to establish the association relationship between the first identification and the second identification. The association relationship may thus be established between the software development task in the project task tracking system and the program code of the software development task in the software code management system.

Step S203: receiving the selection instruction of the software development task, and obtaining the first identification corresponding to the selected software development task in accordance with the selection instruction.

When developers need to reuse a software development task, they can select the software development task to be reused. Upon receiving the selection instruction of the software development task, developers may get the first identification corresponding to the selected software development task based on the selected state of the software development task.

Step S204: based on first identification corresponding to the selected software development task, obtaining all the second identifications associated with the first identification.

The association relationship between the first identification and the second identification corresponding to the software development task is established in Step S202. Therefore, after obtaining the first identification corresponding to the selected software development task, all the second identifications associated with the first identification can be obtained based on the first identification.

Step S205: generating a script file based on the first identification and all the associated second identifications corresponding to the selected software development task, and sending the script file to the transplantation-script-analyzing client; and analyzing, by the transplantation-script-analyzing client, the script file to acquire the first identification and all the associated second identifications corresponding to the selected software development task, and further, to get the entire program code of the corresponding software development task in the software code management system based on all the obtained second identifications, and output the entire program code.

A script file is generated with the obtained first identification and all the associated second identifications, and the first identification and all the associated second identifications are sent, in the form of a script file, to the transplantation-script-analyzing client. Then the transplantation-script-analyzing client finds out the first identification and all the associated second identifications corresponding to the software development task by analyzing the received script file, and further, based on all the obtained second identifications, obtains the program code related to the selected software development task in the software code management system, and outputs the obtained program code.

Therefore, when developers need to reuse a software development task, by simply selecting the software development task, they can quickly get the entire program code of the software development task, without the need to spend a lot of time and efforts in searching for the program code, greatly improving the development efficiency of software projects.

Figure 3:
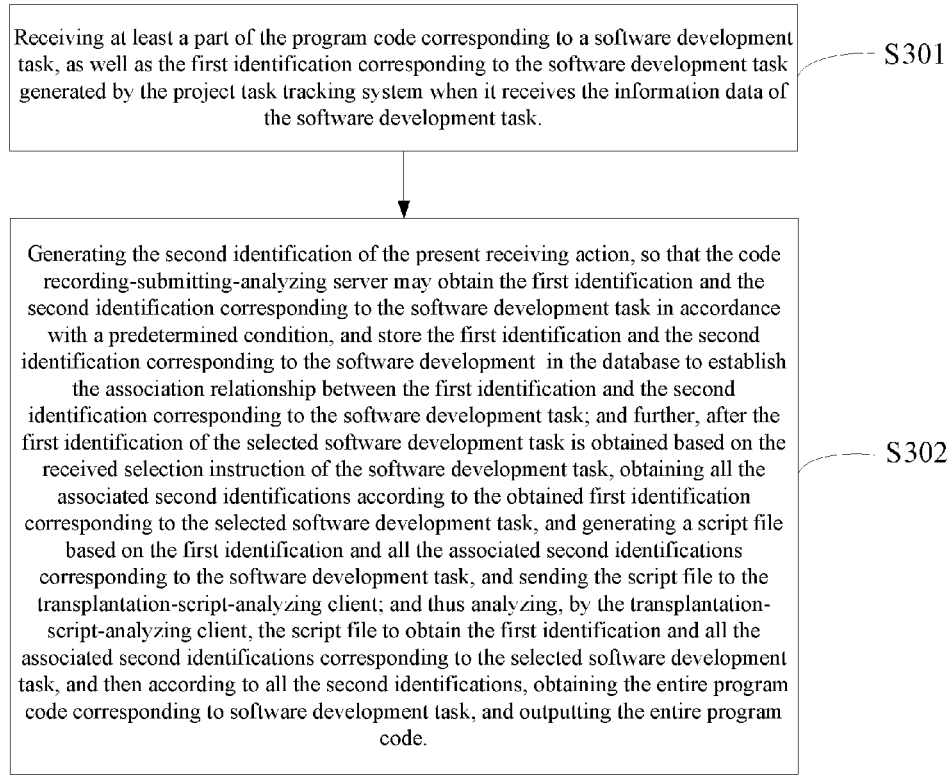
FIG. 3 illustrates a flow chart for still another exemplary implementation process for software development tasks consistent with the disclosed embodiments.

Referring to FIG. 3, another exemplary implementation method for software development tasks may include following steps.

Step S301: receiving at least a part of the program code corresponding to a software development task, as well as the first identification corresponding to the software development task generated by a project task tracking system when it receives the information data of the software development task.

The project task tracking system, upon receiving the information data of the software development task, generates the first identification corresponding to the software development task, and sends the first identification. After establishing the software project to be developed and the software development tasks to be developed under the software project in the project task tracking system, developers can upload the program code corresponding to the software development task. Developers may upload the program code of the software development task for one time, and may also upload the program code of the software development task in multiple times. That is, in the process of compiling the program code of the software development task, developers may upload the entire program code of the software development task at one time, and may also divide the program code into several parts and upload them multiple times, and as well, may revise a part of the code many times and uploads the revised part of the program code many times.

Step S302: generating the second identification of the present receiving action, so that the code recording-submitting-analyzing server may obtain the first identification and the second identification corresponding to the software development task in accordance with a predetermined condition, and store the first identification and the second identification corresponding to the software development in the database to establish the association relationship between the first identification and the second identification corresponding to the software development task; and further, after the first identification of the selected software development task is obtained based on the received selection instruction of the software development task, obtaining all the associated second identifications according to the obtained first identification corresponding to the selected software development task, and generating a script file based on the first identification and all the associated second identifications corresponding to the software development task, and sending the script file to the transplantation-script-analyzing client; and thus analyzing, by the transplantation-script-analyzing client, the script file to obtain the first identification and all the associated second identifications corresponding to the selected software development task, and then according to all the second identifications, obtaining the entire program code corresponding to software development task, and outputting the entire program code.

Regardless of the way in which developers upload the program code, after receiving the program code corresponding to the software development task, a second identification of the present receiving action is generated, identifying the program code of the software development task received this time, that is, the second identification corresponds to the program code of the software development task received by the present receiving action. The received program code is stored to code repositories.

Generating the second identification of the present receiving action, i.e. indicating the receiving action which generates the program code, triggers the code recording-submitting-analyzing server to obtain the first identification and the second identification corresponding to the software development task, and to store the acquired first identification and second identification in the database to establish the association relationship between them. In the later procedure, after the code recording-submitting-analyzing server receives a selection instruction of a software development task and obtains the first identification corresponding to the selected software development task in accordance with the selection instruction, all the associated second identifications may be obtained according to the obtained first identification, and the obtained first identification and all the associated second identifications may be sent, in the form of a script file, to the transplantation-script-analyzing client. Thus, the transplantation-script-analyzing client may obtain all the second identifications corresponding to the selected software development task according to the received script file, and further, rapidly gets the entire program code of the selected software development task from code repositories in accordance with the obtained second identifications.

Therefore, to reuse a software development task, developers may simply select the software development task, and then the transplantation-script-analyzing client gets all the associated second identifications based on the first identification corresponding to the selected software development task, and further quickly acquires all the program codes of the select software development task, without the need for developers to manually search for the program code of the software development task to be reused, greatly improving the efficiency of software development.

In other embodiments, the code recording-submitting-analyzing server may also obtain the second identification generated by the present receiving action and the first identification corresponding to the software development task at a fixed time interval.

Another exemplary implementation method for software development tasks may include: receiving the information data of a software development task, and generating the first identification corresponding to the software development task, so that developers can upload part or all of the program code and the first identification corresponding to the software development task, to the software code management system; then receiving, by the software code management system, the program code and the first identification corresponding to the software development task, and generating the secondary identification of the present receiving action, wherein the secondary identification identifies the program code of the software development task received by the software code management at this time.

Generating the second identification of the present receiving action, i.e. indicating the receiving action which generates the program code, triggers the code recording-submitting-analyzing server to obtain the first identification and the second identification corresponding to the software development task, and store the acquired first identification and second identification in the database to establish the association relationship between them. In the later procedure, after the code recording-submitting-analyzing server receives a selection instruction of a software development task and obtains the first identification corresponding to the selected software development task in accordance with the selection instruction, all the associated second identifications may be obtained according to the obtained first identification, and the obtained first identification and all the associated second identifications may be sent, in the form of a script file, to the transplantation-script-analyzing client. Thus the transplantation-script-analyzing client may obtain all the second identifications corresponding to the selected software development task according to the received script file, and further, rapidly gets the entire program code of the selected software development task from code repositories in accordance with the obtained second identifications.

Therefore, to reuse a software development task, developers may simply select the software development task, and then the transplantation-script-analyzing client gets all the associated second identifications based on the first identification corresponding to the selected software development task, and further quickly acquires all the program codes of the select software development task, without the need for developers to manually search for the program code of the software development task to be reused, greatly improving the efficiency of software development.

Figure 4:
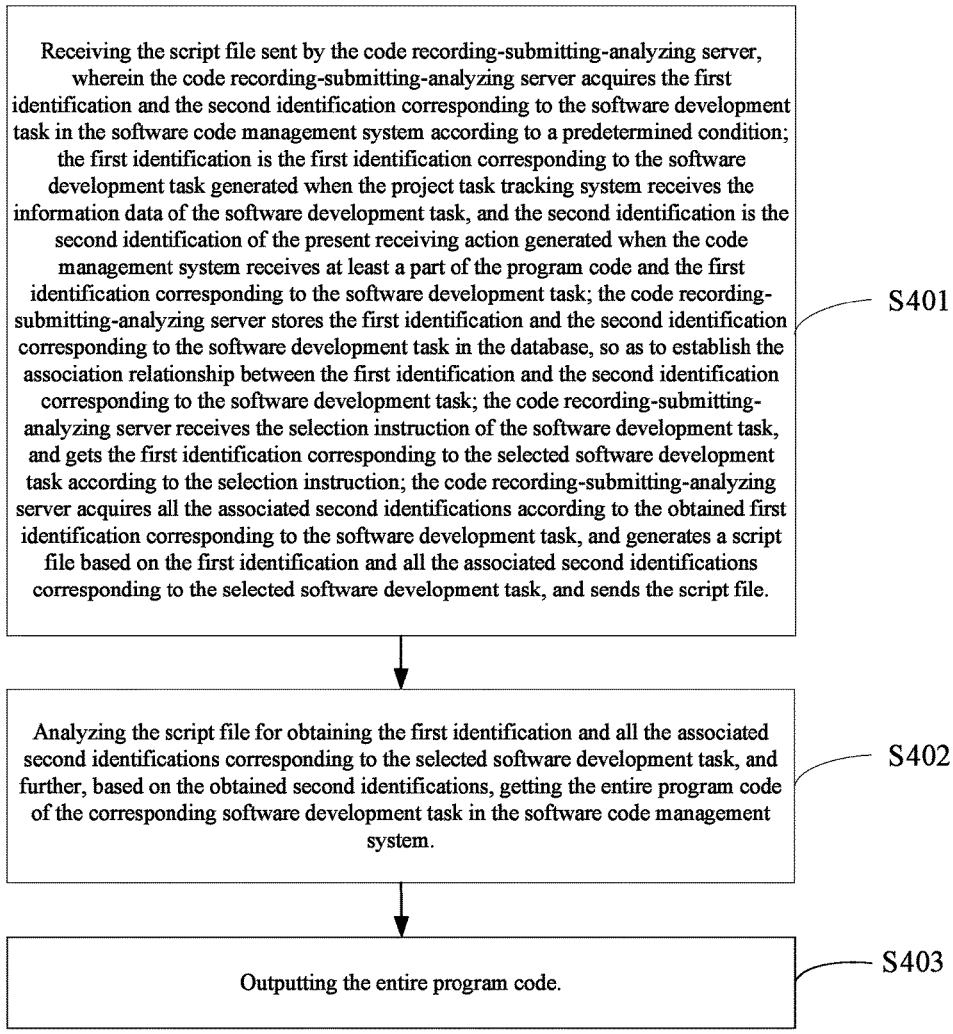
FIG. 4 illustrates a flow chart for still another exemplary implementation process for software development tasks consistent with the disclosed embodiments.

Referring to FIG. 4, another exemplary implementation method for software development tasks may include following steps.

Step S401: receiving the script file sent by the code recording-submitting-analyzing server, wherein the code recording-submitting-analyzing server acquires the first identification and the second identification corresponding to the software development task in the software code management system according to a predetermined condition; the first identification is the first identification corresponding to the software development task generated when the project task tracking system receives the information data of the software development task, and the second identification is the second identification of the present receiving action generated when the code management system receives at least a part of the program code and the first identification corresponding to the software development task; the code recording-submitting-analyzing server stores the first identification and the second identification corresponding to the software development task in the database, so as to establish the association relationship between the first identification and the second identification corresponding to the software development task; the code recording-submitting-analyzing server receives the selection instruction of the software development task, and gets the first identification corresponding to the selected software development task according to the selection instruction; the code recording-submitting-analyzing server acquires all the associated second identifications according to the obtained first identification corresponding to the software development task, and generates a script file based on the first identification and all the associated second identifications corresponding to the selected software development task, and sends the script file.

Firstly, the project information and the information data of every software developer task under the software project are inputted, and the project task tracking system, upon receiving the information data of the software development task, generates a first identification corresponding to the software development task. Then the program code corresponding to the software development task is uploaded to the software code management system, and the entire program code of software development task can be uploaded at one time, and the program code can also be divided into multiple parts and uploads multiple times.

Software code management system receives the uploaded program code of the software development task, and generates a second identification of the present receiving action. This second identification identifies the program code of the software development task received by the software code management system at the present receiving action. The code recording-submitting-analyzing server acquires the first identification and the second identification corresponding to the software development task in the software code management system, and stores the first identification and the second identification in the database to establish the association relationships between the them, thereby establishing the association relationship between the software development task in the project task tracking system and the program code of the corresponding software development task in the software code management system.

When the code recording-submitting-analyzing server receives the selection instruction for selecting a software development task, it acquires all the associated identifications based on the first identification corresponding to the selected software development task, and generates a script file based on the obtained first identification and second identifications, and sends the script file.

Step S402: analyzing the script file for obtaining the first identification and all the associated second identifications corresponding to the selected software development task, and further, based on the obtained second identifications, getting the entire program code of the corresponding software development task in the software code management system.

By generating the first identification and the second identification respectively, the association relationship between the software development task in the project task tracking system and the program code of the software development task in the software code management system may be established. Further, after obtaining the first identification corresponding to the software development task, all the second identifications associated with the first identification may be obtained, and further the entire program code of the software development task may be acquired based on the obtained second identifications.

Step S403: outputting the entire program code. By outputting the acquired program code of software development task, developers may reuse the program code in other software projects.

If one first identification is associated with only one second identification, indicating that the corresponding program code of the software development task is one-time uploaded, all the outputted program code is the entire program code. If one first identification is associated with a plurality of second identifications, indicating that the corresponding program code of the software development task are divided into multiple parts and uploaded multiple times, all parts of the program code may be acquired from the software code management system based on the plurality of second identifications respectively, wherein each part of the program code corresponds to a second identification. All parts of the program code are subsequently combined to obtain the entire program code corresponding to the software development task, and the resultant combined program code is then outputted. Therefore, developers may directly transplant the program code outputted by the transplantation-script-analyzing client to other software projects, without the need to spend more time and efforts in searching for the program code of the software development task.

Figure 5:
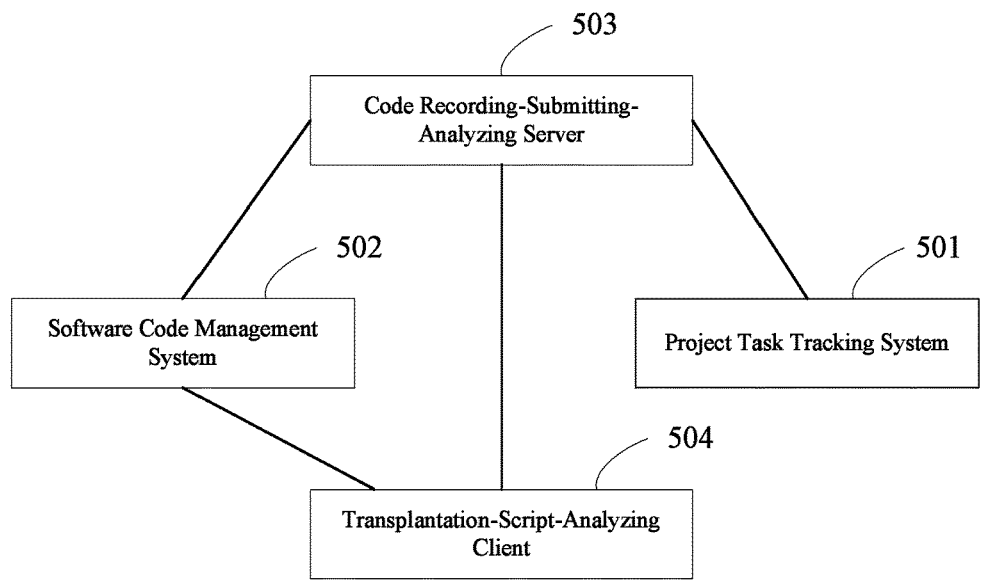
FIG. 5 illustrates a structure schematic diagram for an exemplary system for the realization of software development tasks consistent with the disclosed embodiments.

Referring to FIG. 5, an exemplary system for the realization of software development tasks includes a project task tracking system 501, a software code management system 502, a code recording-submitting-analyzing server 503, and a transplantation-script-analyzing client 504.

The project task tracking system 501 is configured to receive the information data of the software development task, and generate the first identification corresponding to the software development task, wherein the information data of a software development task includes the name, the functionality description, the status and other information of the software development task. The software code management system 502 is configured to receive at least a part of the program code and the first identification corresponding to the software development task, and generate the second identification of the present receiving action. The first identification received by the software code management system 502 may be the first identification corresponding to the software development task uploaded when developers upload the program code corresponding to the software development task.

The code recording-submitting-analyzing server 503 is configured to acquire the first identification and the second identification corresponding to the software development task from the software code management system 502 according to a predetermined condition, and store the first identification and the second identification corresponding to the software development task in the database, so as to establish the association relationship between the first identification and the second identification corresponding to the software development task.

Specifically, the code recording-submitting-analyzing server 503 acquires the first identification and the second identification corresponding to the software development task from the software code management system 502 at a fixed time interval. Of course, the code recording-submitting-analyzing server 503 may also, upon detecting that the software code management system 502 generates the second identification corresponding to the present receiving action, acquires the first identification and the second identification corresponding to the software development task from the code management system 502.

In addition, the code recording-submitting-analyzing server 503 is configured also to acquire the information data of the software development task from the project task tracking system 501 according to the first identification corresponding to the software development task, and display the information data, providing references for developers to select the software development task to be reused. When developers choose a software development task to be reused, the code recording-submitting-analyzing server 503 can also be used to receive the selection instruction of the software development task, and obtain the first identification of the software development task according to the selection instruction, and get all the associated second identifications according to the obtained first identification, and further, generate a script file based on the obtained first identification and all the associated the second identifications, and send the script file to the transplantation-script-analyzing client 504.

The transplantation-script-analyzing client 504 receives the script file, and analyzes the script file for obtaining the first identification and all the associated second identifications corresponding to the software development task, and further, based on all the obtained the second identifications, gets the entire program code of the selected software development task from the software code management system 502, and outputs it. Thus, according to this embodiment, developers can quickly find the entire program code corresponding to the software development task to be reused, without the need for developers to spend a lot of time and efforts in manually searching for the program code, greatly improving the development efficiency.

Figure 6:
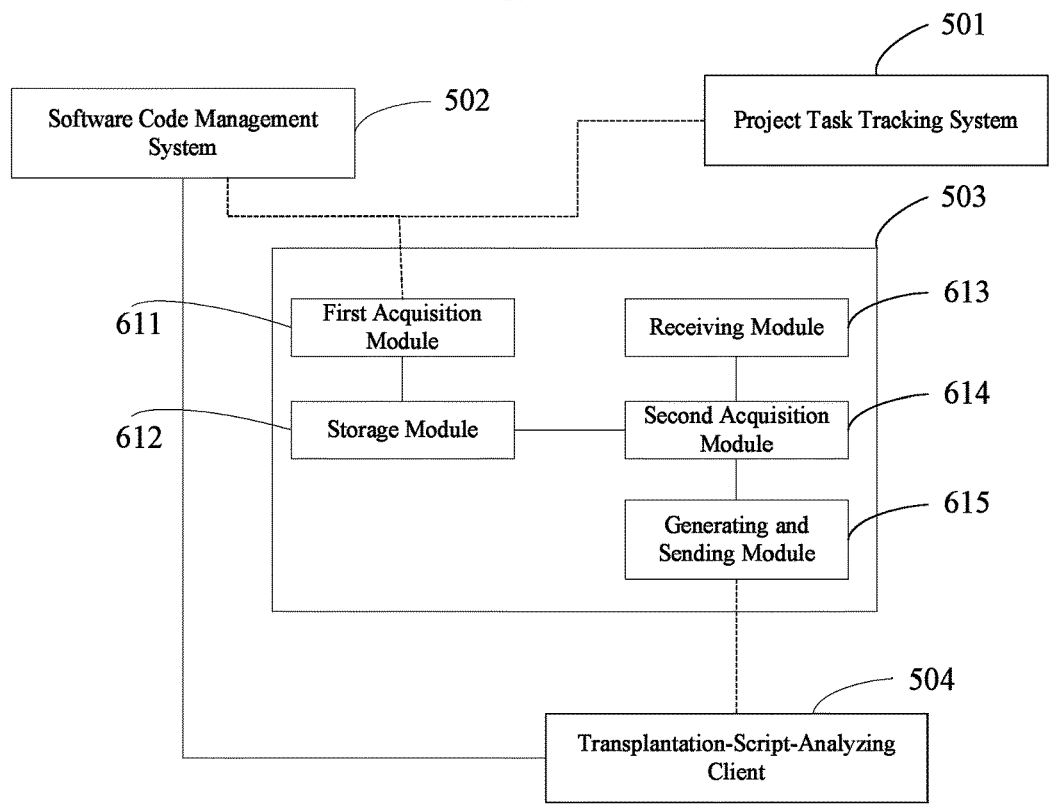
FIG. 6 illustrates a structure schematic diagram for another exemplary system for the realization of software development tasks consistent with the disclosed embodiments.

Referring to FIG. 6, another exemplary system for the realization of software development tasks includes a code recording-submitting-analyzing server 503, which includes a first acquisition module 611, a storage module 612, a receiving module 613, a second acquisition module 614, and a generating and sending module 615.

The first acquisition module 611 is configured to acquire the first identification and the second identification corresponding to the software development task from the software code management system 502 in accordance with a predetermined condition. The first identification corresponding to the software development task is the first identification of the corresponding software development task generated when the project task tracking system 501 receives the information data of the software development task; and the second identification is the second identification of the present receiving action generated when the software code management system 502 receives at least a part of the program code and the first identification corresponding to the software development task. The second identification is used to identify the program code received by the software code management system 602 this time.

The storage module 612 is configured to store the first identification and the second identification corresponding to the software development task in the database, so as to establish the association relationship between the first identification and the second identification corresponding to the software development task. Therefore, the association relationship between the software development task in the project task tracking system and the program code of the software development task in the software code management system may be established.

The receiving module 613 is configured to receive the selection instruction of the software development task, and get the first identification corresponding to the selected software development task in accordance with the selection instruction.

Developers may select the software development task to be reused in the code recording-submitting-analyzing server 503. After receiving the selection instruction, the receiving module 613 receives the first identification corresponding to the software development task at the selected state.

The second acquisition module 614 is configured to acquire all the associated second identifications based on the obtained first identification corresponding to the selected software development task.

The generating and sending module 615 is configured to generate a script file according to the obtained first identification and all the associated second identifications corresponding to the software development task, and send the script file to the transplantation-script-analyzing client 504. The transplantation-script-analyzing client 504 then analyzes the script file to obtain the first identification and all the associated second identifications corresponding to the software development task from the script file, and further acquires the entire program code of the corresponding software development task from the software code management system 502 based on all the second identifications.

Through the system with the present embodiment, developers may quickly get the entire program code of the software development task to be reused from the software code management system 502, thereby improving development efficiency.

Figure 7:
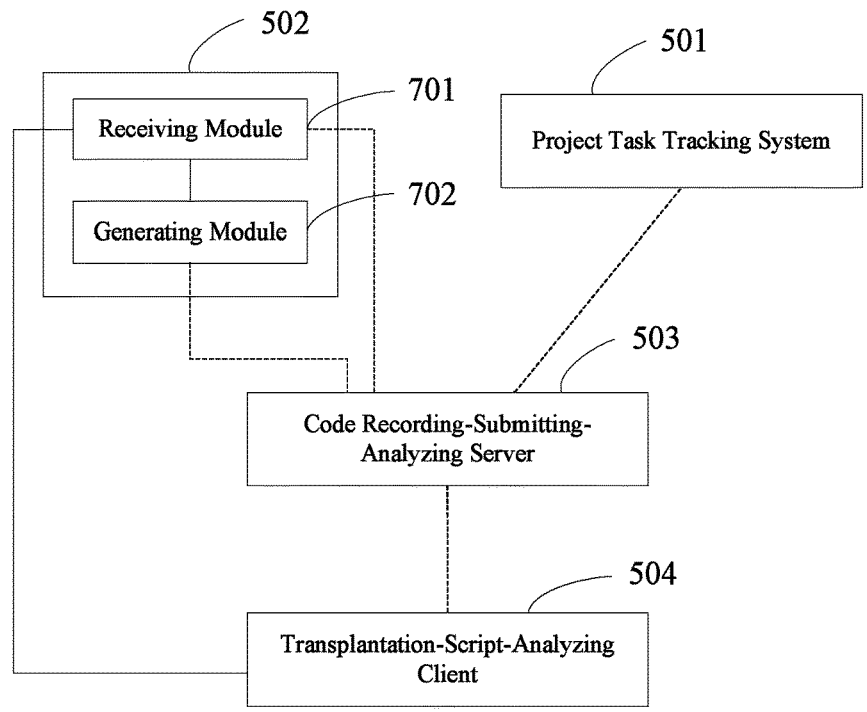
FIG. 7 illustrates a structure schematic diagram for still another exemplary system for the realization of software development tasks consistent with the disclosed embodiments.

Referring to FIG. 7, another exemplary system for the realization of software development tasks includes a software code management system 502, which includes a receiving module 701 and a generating module 702.

The receiving module 701 is configured to receive at least a part of the program code corresponding to the software development task, and the first identification of the corresponding software development task generated when the project task tracking system 501 receives the information data of the software development task. The program code received by the receiving module 701 is stored in code repositories.

The generating module 702 is configured to generate the second identification of the present receiving action. According to the receiving action of the receiving module 701, the generating module 702 generates the second identification of the present receiving action, which is used for identifying the program code corresponding to software development task received this time.

The generating module 702 generates the second identification of the present receiving action, i.e. identifies the receiving action which generates the program code, thereby triggering the code recording-submitting-analyzing server 503 to obtain the first identification and the second identification corresponding to the software development task, and store the acquired first identification and the second identification in the database to establish relationship between them. In the later procedure, after receiving the selection instruction of a software development task and getting the first identification corresponding to the selected software development task in accordance with the selection instruction, the code recording-submitting-analyzing server 503 obtains all the associated second identifications according to the obtained first identification, and sends the obtained first identification and all the associated second identifications, in the form of a script file, to the transplantation-script-analyzing client 504. Thereby the transplantation-script-analyzing client 504 obtains all the second identifications corresponding to the selected software development task according to the received script file, and further, rapidly gets the entire program code of the selected software development task from code repositories in accordance with the obtained second identifications, and outputs the entire program code.

Figure 8:
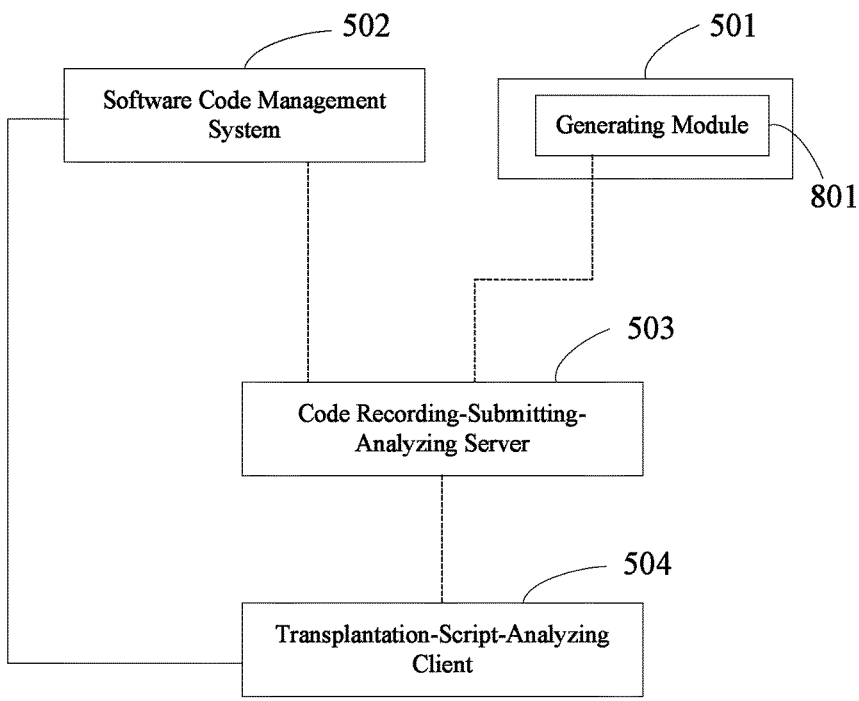
FIG. 8 illustrates a structure schematic diagram for still another exemplary system for the realization of software development tasks consistent with the disclosed embodiments.

Referring to FIG. 8, another exemplary system for the realization of software development tasks includes a project task tracking system 501. The project task tracking system 501 includes a generating module 801 configured to receive the information data of a software development task, and generate the first identification corresponding to the software development task. Developers may upload the program code and the first identification corresponding to the software development task to the software code management system 502. The software code management system 502 receives at least a part of the program code and the first identification corresponding to the software development task, and generates the secondary identification of the present receiving action, identifying the receiving action in which the program code is received.

The code recording-submitting-analyzing server 503 is thus triggered to obtain the first identification and the second identification corresponding to the software development task, and store the acquired first identification and the second identification in the database to establish relationship between them. Further, after obtaining the first identification corresponding to the selected software development task in accordance with the received selection instruction, the code recording-submitting-analyzing server 503 obtains all the associated second identifications according to the obtained first identification, and send the obtained first identification and all the associated second identifications, in the form of a script file, to the transplantation-script-analyzing client 504.

The transplantation-script-analyzing client 504 analyzes the script file for obtaining the first identification and all the second identifications corresponding to the selected software development task, and further, gets the entire program code of the selected software development task from the software code management system based on all the obtained second identifications, and outputs the entire program code.

Figure 9:
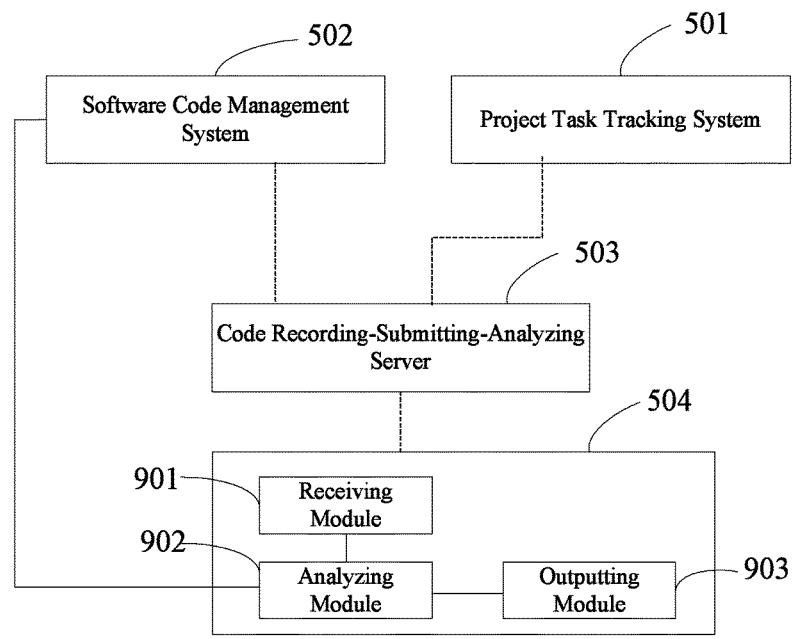
FIG. 9 illustrates a structure schematic diagram for still another exemplary system for the realization of software development tasks consistent with the disclosed embodiments.

Referring to FIG. 9, another exemplary system for the realization of software development tasks includes a transplantation-script-analyzing client 504, which includes a receiving module 901, an analyzing module 902 and an outputting module 903.

The receiving module 901 is configured to receive the script file submitted by the code recording-submitting-analyzing server 503, wherein, the code recording-submitting-analyzing server 503 acquires the first identification and the second identification corresponding to the software development task in the software code management system 502 according to a predetermined condition. The first identification is the first identification corresponding to the software development task generated when the project task tracking system 501 receives the information data of the software development task, and the second identification is the second identification of the present receiving action generated when the software code management system 502 receives at least a part of the program code and the first identification corresponding to the software development task. The code recording-submitting-analyzing server 503 stores the first identification and the second identification corresponding to the software development task in the database, so as to establish the association relationship between the first identification and the second identification corresponding to the software development task. The code recording-submitting-analyzing server 503 receives the selection instruction of the software development task, and gets the first identification corresponding to the selected software development task according to the selection instruction, and further, acquires all the associated second identifications according to the obtained first identification corresponding to the software development task, and generates a script file based on the first identification and all the associated second identifications corresponding to the selected software development task, and sends the script file.

The analyzing module 902 is configured to analyze the script file to get the first identification and all the associated second identifications corresponding to the selected software development task, and then get the entire program code of the corresponding software development task in the software code management system 502 based on all the obtained second identifications. The outputting module 903 is configured to output the entire program code.

The above descriptions are only the exemplary embodiments of the present invention, and do not limit the patented scope of the present invention. Any equivalent structures and equivalent process transformations generated based on the descriptions and the drawings of the present invention, and all the direct and indirect applications of the present invention to other related technological areas are included in the patent protection scope of the present invention.

What is claimed is:

1. A method for realizing reuse among software development tasks, comprising:
    receiving, by a project task tracking system, information data of a software development task, and generating a first identification corresponding to the software development task;
    receiving, by a software code management system, program code corresponding to the software development task and the first identification, and generating one or more second identifications of the program code, wherein an amount of the second identifications equals a number of receiving times of the program code;
    acquiring, by a code recording-submitting-analyzing server, the first identification and the second identifications corresponding to the software development task in the software code management system according to a predetermined condition;
    storing, by the code recording-submitting-analyzing server, the first identification and the second identifications corresponding to the software development task in a software development task database to establish an association relationship between the first identification and the second identifications corresponding to the software development task; and
    outputting the program code to be reused based on the first identification.

2. The method according to claim 1, wherein outputting the program code further includes:
    receiving, by the code recording-submitting-analyzing server, a selection instruction for the software development task, and obtaining the first identification corresponding to the software development task according to the selection instruction;
    obtaining, by the code recording-submitting-analyzing server from the software development task database, the second identifications associated with the obtained first identification corresponding to the selected software development task; and
    generating, by the code recording-submitting-analyzing server, a script file based on the first identification and the associated the second identifications corresponding to the software development task, and sending the script file to a transplantation-script-analyzing client.

3. The method according to claim 2, further including:
    analyzing, by the transplantation-script-analyzing client, the script file to obtain the first identification and the associated second identifications corresponding to the software development task; and
    acquiring, by the transplantation-script-analyzing client, the program code of the software development task in the software code management system in accordance with the obtained second identifications, and outputting the program code.

4. The method according to claim 3, wherein the program code is received in a plurality of receiving actions, and the receiving program code corresponding to the software development task and the first identification and generating one or more second identifications of the program code further includes:
    receiving, by the software code management system, at least a part of the program code in each of the plurality of receiving actions; and
    generating, by the software code management system, one second identification for each of the plurality of receiving actions.

5. The method according to claim 4, wherein acquiring, by the transplantation-script-analyzing client, the program code of the software development task further includes:
    acquiring, by the transplantation-script-analyzing client, the at least part of the program code for each of the second identification; and
    merging, by the transplantation-script-analyzing client, the at least part of the program code for each of the second identification into the program code of the software development task.

6. The method according to claim 5, wherein acquiring, by the code recording-submitting-analyzing server, the first identification and the second identifications corresponding to the software development task in the software code management system according to a predetermined condition, further includes:
    acquiring, by the code recording-submitting-analyzing server, the first identification and the second identifications corresponding to the software development task from the software code management system at a fixed time interval or upon detecting that the software code management system generates a second identification of a current receiving action.

7. The method according to claim 5, wherein receiving, by the software code management system, the program code and the first identification corresponding to the software development task, and generating the second identifications further includes:
    receiving, by the software code management system, the at least a part of the program code and note information corresponding to the software development task, wherein the note information include the first identification, the name and the functionality description corresponding to the software development task; and
    generating, by the software code management system, receiving information for this time and the second identification of the current receiving action based on the note information.

8. A system for realizing reuse among software development tasks, comprising:
a memory; and
a processor coupled to the memory, the processor being configured to
receive information data of a software development task, and generate a first identification corresponding to the software development task;
receive program code corresponding to the software development task and the first identification, and generate one or more second identifications of the program code, wherein an amount of the second identifications equals a number of receiving times of the program code; and
acquire the first identification and the second identifications corresponding to the software development task in the software code management system according to a predetermined condition, and store the first identification and the second identifications corresponding to the software development task in a software development task database to establish an association relationship between the first identification and the second identifications corresponding to the software development task.

9. The system according to claim 8, wherein the processor is further configured to:
receive a selection instruction for the software development task, and obtaining the first identification corresponding to the software development task according to the selection instruction;
obtain from the software development task database the second identifications associated with the obtained first identification corresponding to the selected software development task; and
generate a script file based on the first identification and the associated the second identifications corresponding to the software development task.

10. The system according to claim 9,
wherein the processor is further configured to:
receive the script file from the code recording-submitting-analyzing server;
analyze the script file to obtain the first identification and the associated second identifications corresponding to the software development task;
acquire the program code of the software development task in the software code management system in accordance with the obtained second identifications; and
output the program code.

11. The system according to claim 10, wherein the processor is further configured to receive the program code a plurality of receiving actions.

12. The system according to claim 11, wherein the processor is further configured to:
receive at least a part of the program code in each of the plurality of receiving actions; and
generate one second identification for each of the plurality of receiving actions.

13. The system according to claim 12, wherein the processor is further configured to:
acquire the at least part of the program code for each of the second identification; and
merge the at least part of the program code for each of the second identification into the program code of the software development task.

14. The system according to claim 13, wherein the processor is further configured to:
acquire the first identification and the second identifications corresponding to the software development task from the software code management system at a fixed time interval or upon detecting that the software code management system generates a second identification of a current receiving action.

15. The system according to claim 13, wherein the processor is further configured to:
receiving the at least a part of the program code and note information corresponding to software development task, wherein the note information include the first identification, the name and the functionality description corresponding to the software development task; and
generate receiving information for this time and the second identification of the current receiving action based on the note information.

\* \* \* \* \*